United States Patent
Asa

(10) Patent No.: US 8,616,985 B2
(45) Date of Patent: Dec. 31, 2013

(54) COUPLING

(75) Inventor: Yukihiro Asa, Tokyo (JP)

(73) Assignee: Asa Electronics Industry Co., Ltd., Tokyo (JP)

(*) Notice: Subject to any disclaimer, the term of this patent is extended or adjusted under 35 U.S.C. 154(b) by 0 days.

(21) Appl. No.: 13/442,127

(22) Filed: Apr. 9, 2012

(65) Prior Publication Data

US 2012/0264525 A1    Oct. 18, 2012

(30) Foreign Application Priority Data

Apr. 15, 2011  (JP) ................................ 2011-091529

(51) Int. Cl.
*F16D 3/04*    (2006.01)

(52) U.S. Cl.
USPC ............................................ 464/75; 464/104

(58) Field of Classification Search
USPC ....................................... 464/73, 75, 102, 104
See application file for complete search history.

(56) References Cited

U.S. PATENT DOCUMENTS 2,891,395 A * 6/1959 Chater ............................ 464/75
3,924,419 A * 12/1975 Barth ............................. 464/73
4,034,575 A * 7/1977 Barth ............................. 464/73
4,118,952 A * 10/1978 Kobayashi
2003/0220146 A1* 11/2003 Bonninger et al. ............. 464/73

FOREIGN PATENT DOCUMENTS

| JP | 8-200383 A | 8/1996 |
| JP | 2002-327774 A | 11/2002 |
| JP | 2006-029400 | 2/2006 |
| JP | 2009-190519 A | 8/2009 |

OTHER PUBLICATIONS

Office Action issued in corresponding Japanese application 2011-091529 mailed on Mar. 7, 2013 (no translation available, submitted for certification).

* cited by examiner

*Primary Examiner* — Gregory Binda
*Assistant Examiner* — Josh Skroupa
(74) *Attorney, Agent, or Firm* — Griffin & Szipl, P.C.

(57) ABSTRACT

A coupling that requires misalignment measures comprises a first hub and second hub, and a connection member that connects the first hub 10 and second hub 20 with each other, wherein the connection member has a plurality of columns, and beams that connect the respective columns with each other, wherein the beams that are next to each other among the respective beams are connected with the respective columns at the end of the first hub side on one side, and are connected with the respective columns at the end on the second hub side.

4 Claims, 2 Drawing Sheets

COUPLING

This application claims priority from Japanese Patent Application No. 2011-091529, filed Apr. 15, 2011, the entire disclosure of which is incorporated herein by reference.

FIELD OF THE INVENTION

The present invention is related to a coupling, and more specifically, it relates to an Oldham type coupling that is used for the power transmission part of automobiles, aircrafts, ships and industrial machineries, etc.

BACKGROUND OF THE INVENTION

Patent Document 1 discloses a technology of accurately processing the side of protrusion of a hub by the inventor. According to this technology, for a hub for Oldham coupling in which a linear protrusion is formed and coupled with a linear depression formed in a plane slider, the hub for Oldham coupling is formed with sintered alloy and is processed by pressing both sides of the protrusion like a sandwich. The slider uses a resin material such as a super engineering plastic or a conventional plastic and contains reinforcing agents such as glass, carbon or others, and thus it is described that the strength has been secured.
[PATENT DOCUMENT 1] JPA2006-29400

SUMMARY OF THE INVENTION

Problem to be Solved by the Invention

Although the application of the technology according to PATENT DOCUMENT 1 can be highly suitable for the connection between shafts requiring no misalignment measures, it is not suitable for those requiring misalignment measures since the slider has a required strength.

Thus, the subject to be solved by the present invention is to provide a coupling that solves the above problem.

Means of Solving the Problem

In order to solve the above problem, the coupling according to the present invention comprises:

a plurality of hubs (for example, the first hub 10 and the second hub 20 in FIG. 1), and a connection member (for example, the connection member 50 in FIG. 1) that connects said hubs with each other, wherein the connection member has a hardness of 80 to 90 and comprises:

a plurality of columns (for example, the columns 59-62 in FIG. 1) and:

beams (for example, the beams 51, 52, 57, 58 in FIG. 1) that connect the columns with each other, wherein:

the beams that are next to each other among the respective beams are connected with the respective columns at the first end (for example, the end on the first hub 10 side in FIG. 1) on one side, and are connected with the respective columns at the second end (for example, the end on the second hub 20 side in FIG. 1) on the other side.

A cavity may be formed in each column (for example, the cavities 53-56 in FIG. 1), and an axle member may be inserted into said cavity. Furthermore, the connection member may be formed in an approximate ring-shape having an opening through which shafts can penetrate.

BEST MODE FOR CARRYING OUT THE INVENTION

Referring to drawings, an embodiment according to the present invention is described hereinafter.

FIG. 1 shows an exploded perspective view of the Oldham type coupling according to the embodiment of the present invention. FIG. 1 shows the first hub 10, second hub 20, connection member 50, and shafts 30, 40.

The first hub 10 and second hub 20 are formed in the same shape, and those body parts are approximately cylindrical. The first hub 10 and second hub 20 are connected with each other through the connection member 50. The first hub 10 and second hub 20 may be made of plastic or metal. The first hub 10 and second hub 20 may be manufactured by a metal mold casting method including die-casting molding.

An opening 25 for receiving the shaft 40 is formed in the second hub 20. The opening 25 is formed as a through-hole so that even if the shafts 30, 40 are positioned in the same axis, these can be easily attached to the coupling. A slit 23 is integrally formed in the opening 25.

In addition, a screw hole 26 for receiving a screw is formed in the side of the second hub 20 so as to fix the shaft 40 that is received by the opening 25. Furthermore, a pair of claws 21, 22 is formed in the second hub 20 to be connected with the connection member 50. The side of the claws 21, 22 forms a part of the approximate arched shape. A pair of depressions 24 is formed between the claws 21, 22 to reduce the manufacturing cost of the second hub 20.

Since the first hub 10 is formed in the same shape as the second hub 20, the first hub 10, just like the second hub 20, is provided with an opening 15 with a slit 13 for receiving the shaft 30, as well as a screw hole 16, a pair of claws including a claw 11 (FIG. 1 only shows the claw 11), and a pair of depressions (not shown) corresponding to a pair of depressions 24.

FIG. 2 shows a detail view of the connection member 50 shown in FIG. 1. FIG. 2a, FIG. 2b and FIG. 2c respectively show a plan view, a side view from the left-hand side of the FIG. 2a, and a side view from the bottom side of FIG. 2a.

As shown in FIG. 1 and FIG. 2, the connection member 50 is a component that can be called a "spacer" or "slider". The connection member 50 generally has a symmetrical shape, and the one in this embodiment has an approximate ring-shape having an opening through which the shafts 30, 40 can penetrate at the position corresponding to the openings 15, 25 formed in the first and second hubs 10, 20.

In addition, the connection member 50 is provided with columns 59-62 in which cavities 53-56 are selectively formed. In other words, the connection member 50 may be formed with the cavities 53-56 and need not to be formed with the cavities 53-56. Although the size of the cavities 53-56 is not specified, it may be around ⅓ to ½ of the diameter of the columns 59-62.

The columns 59, 60 are connected with each other by the beam 51. The columns 60, 61 are connected with each other by the beam 58. The columns 61, 62 are connected with each other by the beam 52. The columns 62, 59 are connected with each other by the beam 57.

Regarding the beams 51, 58 that are next to each other, the beam 51 connects the columns 59, 60 with each other at the end of the first hub 10 side (the first end), and the beam 58 connects the columns 60, 61 with each other at the end of the second hub 20 side (the second end). Similarly, regarding other beams that are next to each other, one beam connects the corresponding columns at the first end, and the other beam connects the corresponding columns at the second end.

Consequently, when a coupling of this embodiment is manufactured by assembling each member shown in FIG. 1, the end faces of, for example, the claws 21, 22 of the second hub 20 face to the beams 52, 51 respectively, and the end faces of the groove 24 of the second hub 20 face to the beams 57, 58 respectively.

The connection member 50 can be made of a rubber with excellent oil resistance such as ethylene propylene rubber and nitrile rubber, etc. or can be made of resin with excellent oil resistance such as silicon resin. As an example, if the hardness of the connection member 50 is selected from 80 to 90 (for example, a hardness of 85), the columns 59-62, when they are used, can change their shapes due to the hardness, and thus the misalignment between the shafts 30 and 40 can be compensated.

Here, if the hardness of the connection member 50 is set to a value outside the above range, it has been found to cause the following inconveniences. That is, if one with a hardness of less than 80 was used, there was a problem with the connection member 50 getting damaged when it was used. In contrast, if one with a hardness of more than 100 was used, a desired torsion spring characteristic by using those made of rubber or resin could not be obtained, and thus there was a problem of being unable to realize a coupling that requires misalignment measures.

Furthermore, there is an advantage of being able to improve the substantial hardness of the connection member 50 by inserting an axle member that is made of rubber, resin or metal, etc., since the cavities 53-56 have been formed in the connection member 50 of this embodiment.

The shafts 30, 40 are made of stainless steel or ceramic, etc., and their dimensions are about the diameter of the openings 15, 25.

Although this embodiment exemplifies the case that a pair of claws 21, 22 is formed in the second hub 20 as shown in FIG. 1, the number of claws can be 3 or 4. In such cases, regarding other beams that are next to each other, the connection member 50 may be configured to connect the respective columns with each other at the first end on one side and at the second end on the other side.

FIG. 3 shows a chart indicating the measurement results of the torsion spring characteristic of the Oldham type coupling shown in FIG. 1. The horizontal axis of FIG. 3 represents the allowable bending angle [deg], and the vertical axis of FIG. 3 represents the torsion spring constant [N·m/rad].

As shown in FIG. 3, as the allowable bending angle increases from 0 [deg] up to around 7 [deg], the torsion spring constant gently increases linearly from 0 [N·m/rad] up to around 4 [N·m/rad]. Then, as the allowable bending angle increases from 7 [deg] up to around 12 [deg], the torsion spring constant [N·m/rad] rapidly increases linearly from 4 [N·m/rad] up to around 18 [N·m/rad]. Subsequently as the allowable bending angle further increases, the torsion spring constant begins to decrease.

According to FIG. 3, the torsion spring constant of the Oldham type coupling changes in two steps with reference to the allowable bending angle of around 7 [deg]. It is considered that as the allowable bending angle initially increases, the cavities 53-56 are deformed, and thus the torque is less transmitted, for example, from the first hub 10 to the second hub 20, limitedly increasing the torsion spring constant.

This Oldham type coupling is considered to have a normal torque of approximately around 3 [N·m], and as shown in FIG. 4, this Oldham type coupling is considered to have a sufficient torque margin for said normal torque.

FIG. 4 shows a chart indicating the measurement results of the torsion spring characteristic of the Oldham type coupling in which the cavities 53-56 have not been formed. First, comparing FIG. 3 and FIG. 4 with each other, as the allowable bending angle changes from 0 [deg] to 13 [deg], the measurement results shown in FIG. 4 changes more linearly than the measurement results shown in FIG. 3.

Specifically, when the allowable bending angle is around 13 [deg], the torsion spring constant is approximately 25 [N·m/rad]. A reason of having such measurement results is that the cavities 53-56 have not been formed in this Oldham type coupling, making it easy to transmit the torque from the first hub 10 to the second hub 20.

This Oldham type coupling is considered to have a normal torque of approximately 5.5 [N·m], and as shown in FIG. 4, this Oldham type coupling is considered to have a sufficient torque margin for said normal torque.

EXPLANATION OF SYMBOLS

Figure 1:
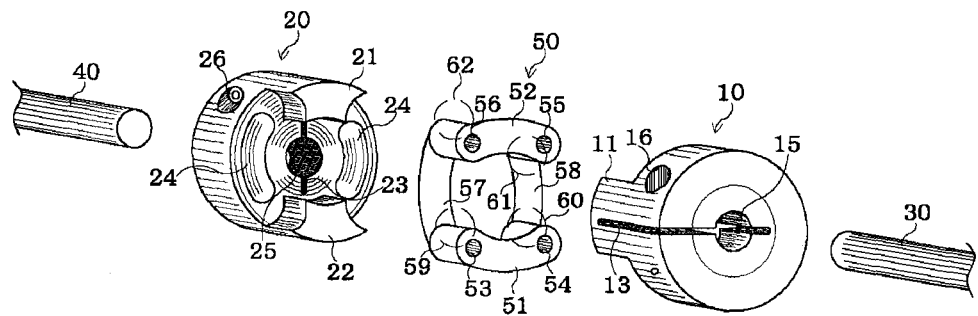
FIG. 1 shows an exploded perspective view of the Oldham type coupling according to the embodiment of the present invention.
Figure 2:
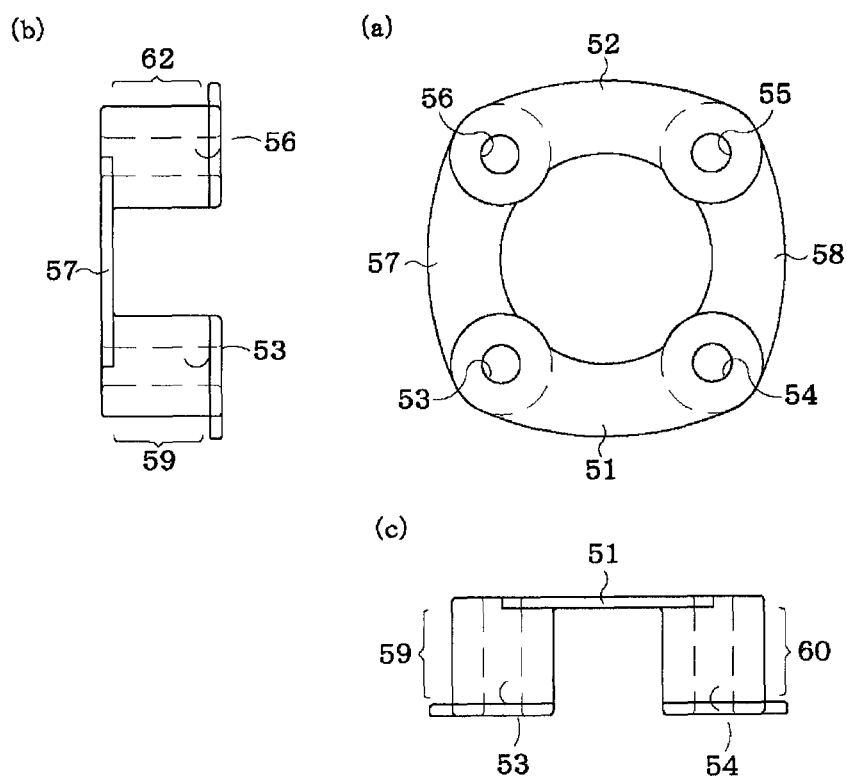
FIG. 2 shows a detail view of the connection member 50 shown in FIG. 1.
Figure 3:
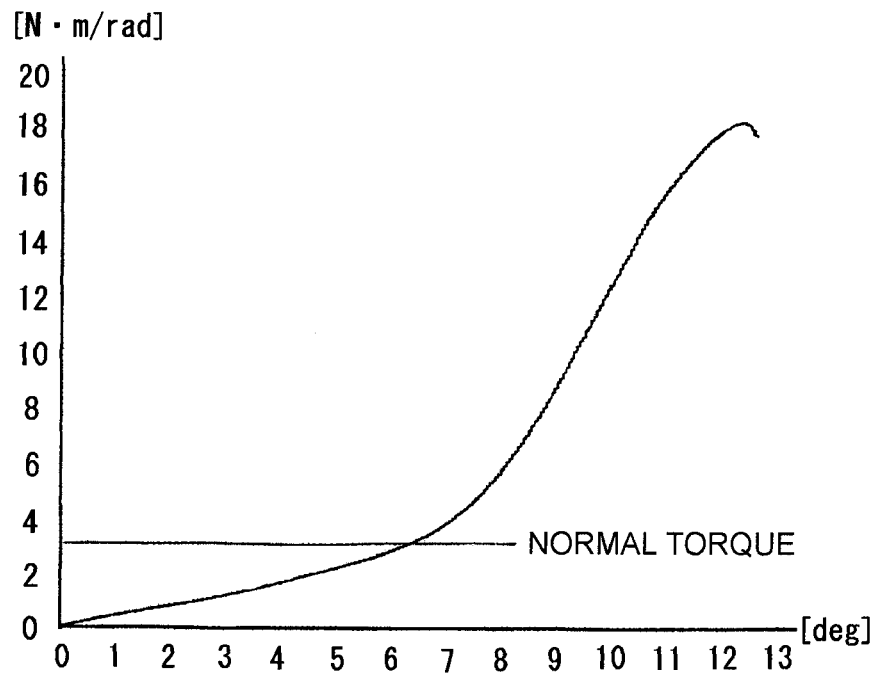
FIG. 3 shows a chart indicating the measurement results of the torsion spring characteristic of the Oldham type coupling shown in FIG. 1.
Figure 4:
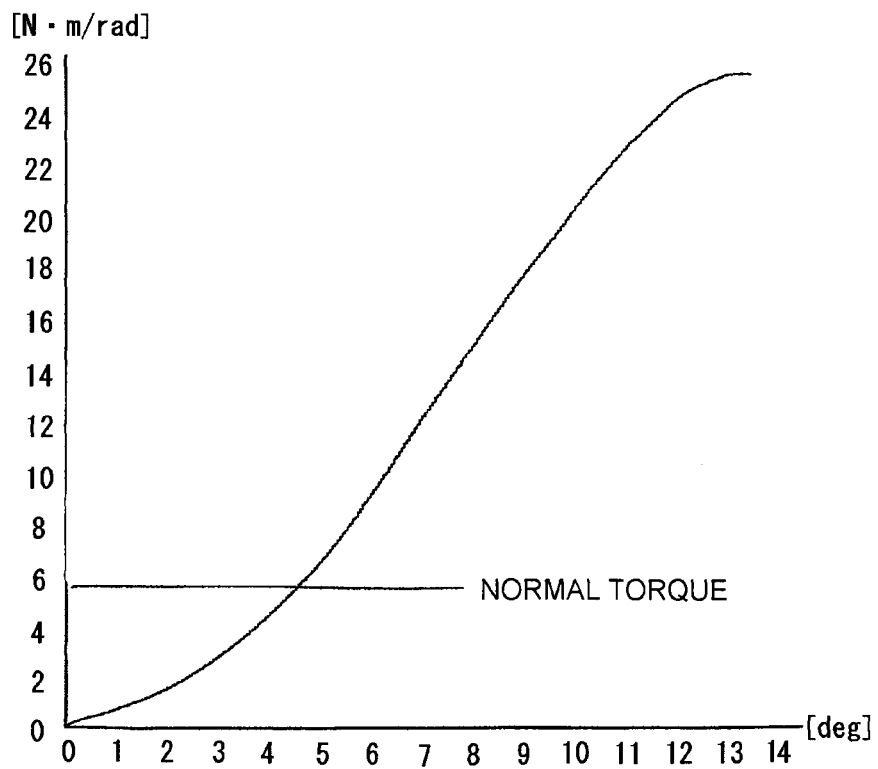
FIG. 4 shows a chart indicating the measurement results of the torsion spring characteristic of the Oldham type coupling in which the cavities 53-56 have not been formed.

10 First hub
20 Second hub
30, 40 Shafts
50 Connection member

The invention claimed is:

1. A coupling comprising:
   (a) a connection member comprising
      (i) a plurality of columns;
      (ii) a plurality of cavities, wherein a cavity is formed in each respective column, wherein the plurality of cavities are deformable and disposed to compensate for any misalignment between one or more shafts connected to a plurality of hubs; and
      (iii) a plurality of beams disposed to connect the respective columns with each other, wherein the beams have a first end on one side, and a second end on another side, and wherein the beams that are disposed next to each other among the respective beams are connected with the respective columns at the first end on one side, and are connected with the respective columns at the second end on the other side; and
   (b) the plurality of hubs, wherein the plurality of hubs are disposed to connect with each other through the connection member.

2. A connection member for connecting a plurality of hubs to each other, the connection member comprising:
   (a) a plurality of columns;
   (b) a plurality of cavities, wherein a cavity is formed in each respective column, wherein the plurality of cavities are deformable and disposed to compensate for any misalignment between one or more shafts connected to the plurality of hubs; and
   (c) a plurality of beams disposed to connect the respective columns with each other, wherein the beams have a first end on one side, and a second end on another side, and wherein the beams that are disposed next to each other among the respective beams are connected with the respective columns at the first end on one side, and are connected with the respective columns at the second end on the other side.

3. The connection member as claimed in claim 2, wherein an axle member is insertable into the cavities that are formed in the respective columns.

4. The connection member as claimed in claim 2, wherein the connection member has an approximate ring-shape having an opening through which shafts can penetrate at the position corresponding to the shaft receiving part formed in the respective hubs.

* * * * *